Dec. 14, 1937.    S. J. NORDSTROM    2,102,211

PLUG VALVE

Filed Dec. 19, 1935

INVENTOR.
Sven J. Nordstrom

BY
Lewis D. Konigsford
ATTORNEY.

Patented Dec. 14, 1937

2,102,211

UNITED STATES PATENT OFFICE 2,102,211

PLUG VALVE

Sven J. Nordstrom, Piedmont, Calif., assignor to Merco Nordstrom Valve Company, Pittsburgh, Pa., a corporation of Delaware Application December 19, 1935, Serial No. 55,238

12 Claims. (Cl. 251—112)

This invention relates to plug valves, particularly of the lubricant jacked type.

It is one object of this invention to provide means for uniformly distributing a resilient seating thrust to an end of the plug.

A further object is the provision of means for uniformly distributing the reaction thrust of a resilient cover employed for holding the plug in its seat.

Still another object is the provision of improved means for lubricating the thrust receiving portion of the plug.

Another object is the provision of improved means for substantially completely sealing the valve passageway in full open and closed positions by lubricant under pressure.

According to the present invention, I provide a fluid chamber between a resilient cover and the end of the plug, which is separate from the lubricant system employed in lubricating and jacking the plug, and by introducing suitable fluid under pressure into this chamber the resilient cover is deflected, the resilient thrust of the cover due to its deflection being transmitted by the fluid to the plug end. Any fluid, semifluid or plastic material may be employed for this purpose, and I prefer to employ a plastic lubricant. The plug end is lubricated by a spiral lubricant groove which preferably obtains its supply of lubricant from the plug lubricating grooves.

An improved system of lubricating grooves provides a substantially complete lubricant seal around the valve passageway in full open and full closed positions of the valve plug, the grooves exposed to line fluid being disconnected from the source of lubricant pressure in intermediate positions of the plug. This arrangement enables the plug to be jacked by lubricant pressure in all positions.

The invention will be described in greater detail in connection with the accompanying drawing, wherein—

Figure 1:
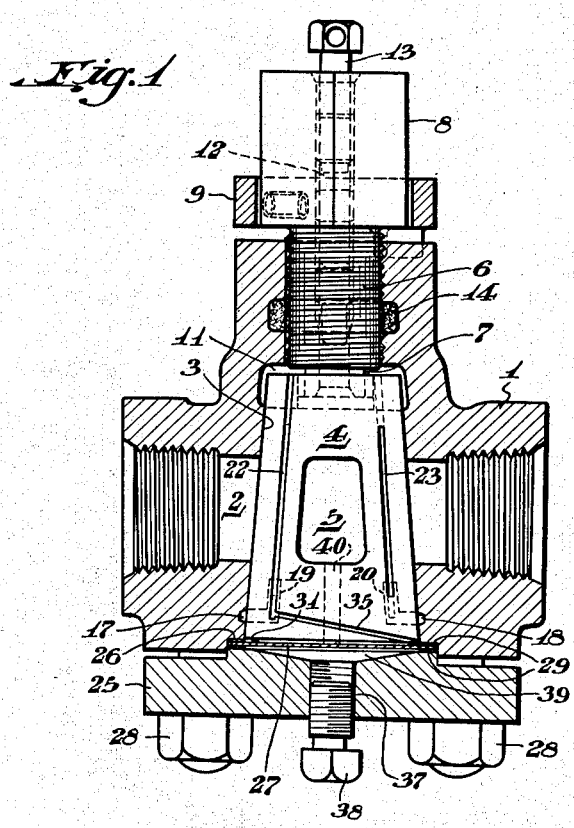
Figure 1 is a vertical section through a valve showing a preferred modification of the invention.

Referring to the drawing, there is shown a valve body or casing 1 having a passageway 2 therethrough for flow of fluid and a tapered valve seat 3 transverse to the passageway. A tapered plug 4 is located in this seat and has a port 5 extending transversely therethrough adapted to register with the passageway 2 in open position of the valve. A threaded operating stem 6 extends through the casing at the smaller end of the plug and has a tongue 7 forming an operative connection with a depression in the smaller end of the plug. The outer end of the stem 6 is squared as indicated at 8 to receive an operating wrench and a suitable stop collar 9 thereon limits rotation of the plug to 90°. A lubricant chamber 11 is formed adjacent the smaller end of the plug, and a threaded bore or reservoir 12 in the plug stem communicates therewith. Lubricant is forced from the reservoir 12 by a threaded screw 13 therein into the chamber 11 for jacking the plug and supplying lubricant to the threaded stem and valve operating surfaces, a secondary packing seal 14 being provided about the stem to prevent leakage.

The lubricating system for the valve operating surfaces comprises a pair of circumferentially disposed grooves 17 and 18 in the casing seat each having a pair of longitudinal extensions 19 and 20 respectively, connected therewith. A diametrically opposite pair of longitudinal grooves 22 extend from the smaller end of the plug to the circumferential grooves 17 and 18 and are adapted to conduct lubricant thereto from the chamber 11. A diametrically opposite pair of shorter longitudinal grooves 23 are disposed on the opposite side of port 5 and connect with the groove extensions 20 and 19 but terminate at the smaller end of the plug short of the lubricant chamber 11.

Figure 2:
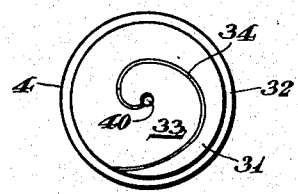
Figure 2 is an elevation of the large end of the plug.

The larger end of the seat 3 is closed by a metal cover 25 bearing on a shoulder 26 of the casing and a diaphragm 27 is clamped between the cover and casing by suitable bolts 28 which hold the cover in place. The cover 25 is preferably made of cast steel or a die forging so as to be sufficiently strong and resilient. Gaskets 29 may be employed to maintain a fluid tight seal between the casing, diaphragm and cover. The plug 4 has an extension 31 at its larger end forming a cut away shoulder 32 with the plug, the extension having a flat end surface 33 which is adapted to bear against the diaphragm 27, and spiral groove 34 (Figure 2) extends from the center of this surface to its outer periphery and is connected to the source of lubricant supply by narrow inclined attenuating groove 35 in the plug surface which is connected at one end with a longitudinal groove 22 and communicates at its other end with the shoulder 32.

The cover 25 has a threaded opening 37 at its center into which a threaded lubricant screw 38 is fitted, and lubricant may be introduced through this opening into the pressure chamber 39 formed between the cover and diaphragm. Upon turning the screw 38 inwardly pressure is exerted on the lubricant in the chamber 39, and this pressure is transmitted uniformly across the large end of the plug by the diaphragm 27 to hold the plug in its seat. If desired, an opening 40 may be provided communicating at one end with port 5 and extending through the plug to balance line pressure on the plug.

In operation line pressure exerts a force on the plug tending to lift the plug out of its seat, and this force is balanced by applying sufficient pressure to the lubricant in chamber 39 by means of the lubricant screw 38 to maintain the plug seated. The unyielding hydraulic pressure of the lubricant in chamber 39 bears uniformly against the inner surface of resilient cover 25 which may yield by its inherent resilience and thus yieldingly holds the plug in its seat. The plug is lubricated and jacked by the application of pressure to the lubricant in chamber 11 by means of screw 13, and it will be apparent that jacking of the plug from its seat is allowed by the resilient cover 25 which yields as pressure is applied to lift the plug from its seat. Friction between the diaphragm 27 and the large end of the plug is reduced by lubricant supplied thereto at a lag in pressure by the spiral groove 34 by means of shoulder 32, and attenuating groove 35 connected to longitudinal groove 22 which in turn is connected to lubricant chamber 11.

In the closed position of the valve there is substantially a complete seal around each port formed by lubricant chamber 11, a longitudinal groove 22, one extension groove 19, circumferential groove 17, the other extension groove 19, and a longitudinal groove 23. In rotating the valve to open position the longitudinal grooves 23 are exposed to line fluid, but are cut off from the source of lubricant pressure because they are disconnected from their respective extension grooves 19 and 20. In open position a similar complete seal around the port is provided by the chamber 11, a longitudinal groove 22, one extension groove 20, circumferential groove 18, the other extension groove 20, and a longitudinal groove 23.

Figure 3:
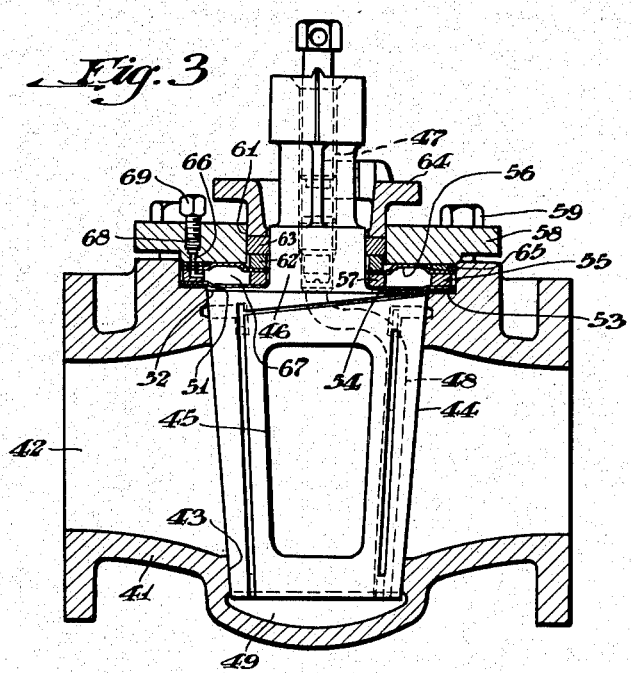
Figure 3 is a vertical section through a further modification of the invention.
Figure 4:
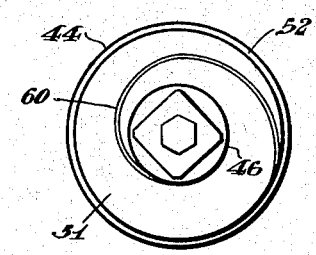
Figure 4 is a plan view of the plug.

In the modification shown in Figure 3 the casing 41 has the usual passageway 42 therethrough for flow of fluid and a tapered seat 43 formed transversely thereof. The plug 44 has a port 45 therethrough for flow of fluid, and an operating stem 46 is provided at the larger end of the plug, preferably integral therewith. A threaded lubricant reservoir 47 is provided in the valve stem and connects with a duct 48 cored through the valve and extending to the bottom chamber 49. As the lubricating system in this modification beginning with chamber 49, which corresponds to chamber 11, is exactly like that shown in Figure 1, the description thereof need not be repeated. A shoulder 51 is provided at the large end of the plug where it joins the stem, the edge of the shoulder being rabbeted at 52.

A shoulder 53 is provided adjacent the large end of the seat, and a metal diaphragm or washer 54 is located on the shoulder 53 and rests on the shoulder 51 of the plug. A metal spacer 55 is located on the diaphragm 54, and a second diaphragm 56 rests on the spacer, and on a metal thrust ring 57 resting on the diaphragm 54 adjacent the valve stem. The diaphragms 54 and 55 are retained in place by a resilient cover 58 which bears thereon and is secured in place by bolts 59, the center of the cover being bored at 61 to receive the valve stem 46. A metal ring 62 is located in the bore 61 on the top diaphragm 56 and a packing ring 63 of resilient material is superposed on metal ring 62, both rings 62 and 63 being pressed against diaphragm 56 by a gland 64 bolted or otherwise secured to the cover. Thus, it will be seen that the inner edge of diaphragm 54 is held in fluid tight relation between the shoulder 51 of the plug and thrust ring 57, and diaphragm 56 is held in fluid tight relation at its inner edge between thrust rings 57 and 62. The outer edges of diaphragms 54 and 56 are held fluid tight by the cover 58 and spacer ring 55, gasket 65 being used, if desired, to ensure a fluid tight joint. Friction between the shoulder 51 of the plug and the diaphragm 54 is reduced by lubricant supplied thereto by a spiral groove 60 in the plug shoulder which extends inwardly from the rabbet 52 to the plug stem. The plug therefore is resiliently urged into its seat by the pressure of the resilient packing ring 63 transmitted thereto by thrust rings 62 and 57. However, it is preferred to utilize the resilient reaction of cover 58 as the main plug seating force.

A bore 66 which is L-shaped in vertical section is formed in filler ring 55, the horizontal portion of which communicates with the chamber 67 formed between the diaphragms 54 and 56, and the vertical portion of which registers with a threaded bore 68 in the cover 58, the hole being extended through gasket 65. A lubricant screw 69 closely fits the threaded bore 68.

In operation, the gland 64 is adjusted to exert sufficient pressure to maintain a fluid tight joint between the plug shoulder 51, thrust ring 57 and 62 and the diaphragms 54 and 56 clamped therebetween, the reaction of the resilient cover 58 urging the plug into its seat. When it is desired to increase the seating pressure on the plug, a quantity of heavy lubricant is introduced in threaded bore 68 and is forced by screw 69 into the chamber 67, where the hydraulic force of the lubricant is evenly distributed over the plug shoulder and resilient cover, and forces the valve into its seat. The resiliency of the cover allows the plug to be jacked by lubricant under pressure in chamber 11.

The invention may be embodied in other specific forms without departure from the spirit or essential characteristics of the present invention. The specific form described herein therefore is to be considered in all respects as illustrative and not restrictive of the invention.

What is claimed and desired to be secured by United States Letters Patent is:—

1. In a plug valve, a casing having a passageway therethrough for flow of fluid and a bore formed transversely of the passageway, a rotatable plug located in said bore, an inherently resilient cover closing one end of the bore, flexible means interposed between the cover and valve casing and providing a fluid chamber with the cover, and means for applying fluid under pressure to said chamber to deflect the cover and yieldingly urge the plug in a longitudinal direction.

2. In a plug valve, a casing having a passageway therethrough for flow of fluid and a bore formed transversely of the passageway, a rotatable plug seated in said bore, a diaphragm closing one end of the bore, an inherently resilient cover clamping the diaphragm against the body and providing a chamber between the diaphragm and cover, means for introducing fluid into said chamber, and means for applying pressure to the fluid therein for urging the plug into its seat.

3. In a plug valve, a casing having a passageway therethrough for flow of fluid and a tapered seat formed transversely of the passageway, a tapered plug seated in said seat, a flexible diaphragm closing the larger end of the seat, a resilient cover clamping the diaphragm against the body and providing a fluid chamber between the cover and diaphragm, means for introducing fluid under pressure into said chamber for deflecting the cover and resiliently urging the plug into its seat, and means for jacking the plug from its seat by lubricant pressure.

4. In a plug valve, a casing having a passageway therethrough for flow of fluid and a bore formed transversely of the passageway, a plug having a flat end surface in said bore, a diaphragm bearing on the casing and surface, a second diaphragm spaced from the first diaphragm, an inherently resilient cover for clamping said diaphragms to the casing at their outer peripheries, means to clamp said diaphragms against said surface at their inner peripheries, and means to introduce fluid under pressure into the space between said diaphragms for deflecting the cover to resiliently urge the plug into its seat.

5. In a plug valve, a casing having a passageway therethrough for flow of fluid and a tapered seat formed transversely of the passageway, a tapered plug seated in said seat, an inherently resilient cover closing the larger end of the seat, a diaphragm clamped against the body by the cover and providing a chamber between the diaphragm and cover and bearing on the larger end of the plug, means for applying fluid under pressure to said chamber to deflect the cover and yieldingly urge the plug into its seat, and means for lubricating the bearing surface of the plug and diaphragm.

6. In a plug valve, a casing having a passageway therethrough for flow of fluid and a tapered seat formed transversely of the passageway, a tapered plug seated in said seat and having a reduced portion providing an operating stem and shoulder, a diaphragm assembly comprising a plurality of diaphragms held in spaced relation to provide a chamber therebetween resting on said casing and shoulder, an inherently resilient cover clamping said diaphragm assembly to the casing at its outer periphery, means to clamp the inner portion of said diaphragm assembly against the shoulder, and means for introducing lubricant under pressure into said chamber to deflect the cover and yieldingly urge the plug into its seat.

7. In a plug valve, a casing having a passageway therethrough for flow of fluid and a tapered seat formed transversely of the passageway, a tapered plug seated in said seat and having a reduced portion providing an operating stem and shoulder, a diaphragm assembly comprising a plurality of diaphragms held in spaced relation to provide a chamber therebetween resting on said casing and shoulder, an inherently resilient cover clamping said diaphragm assembly to the casing at its outer periphery, means to clamp the inner portion of said diaphragm assembly against the shoulder, means for introducing lubricant under pressure into said chamber to deflect the cover and yieldingly urge the plug into its seat, and means to introduce lubricant under pressure between said diaphragm assembly and shoulder of the plug.

8. In a plug valve, a casing having a passageway therethrough for flow of fluid and a tapered seat formed transversely of the passageway, a tapered plug seated in said seat, a flexible diaphragm closing the larger end of the seat and bearing directly on the plug, a resilient cover clamping the diaphragm against the body and providing a lubricant chamber therebetween, means for introducing lubricant under pressure into said chamber for deflecting the cover and resiliently urging the plug into its seat, means for jacking the plug by lubricant under pressure, and means to introduce lubricant under pressure between said diaphragm and bearing surface of the plug.

9. In a plug valve, a valve casing, a rotatable valve plug disposed within the casing, said plug being reduced at one end to provide an operating stem and an annular shoulder adjacent said stem, an expansible chamber assembly of substantially annular shape resting on the plug shoulder and casing, an inherently resilient cover clamping said assembly to the casing, a substantially spiral lubricant channel extending from the edge of said shoulder to the stem, means for supplying viscous lubricant under pressure to said channel, and means to supply lubricant under pressure to said chamber assembly.

10. In a plug valve, a valve comprising a casing having a passageway therethrough and a tapered valve seat therein, a plug seated in the valve seat and having a hole adapted to register with the passageway, the casing being provided with an annular recess surrounding the upper end of the tapered valve seat, an expansible chamber assembly comprising two spaced metal diaphragms forming a chamber therebetween seated in the recess and extending to the valve stem, an inherently resilient valve cover for fixedly holding the outer rim of the assembly against the casing, means for adjustably holding the inner portion of the assembly against the top of the larger end of the plug, and means for introducing lubricant under pressure to said chamber to deflect the cover and resiliently urge the plug into its seat.

11. In a plug valve, a valve comprising a casing having a passageway therethrough and a tapered valve seat therein, a plug seated in the valve seat and having a port adapted to register with the passageway, the larger end of the plug being reduced to provide an annular shoulder and operating stem, the casing being provided with an annular recess surrounding the upper end of the tapered valve seat, an annular diaphragm seated in said recess and resting on the plug shoulder, an expansible chamber assembly comprising a spacer ring resting on the diaphragm surrounding the valve stem, a larger spacer ring resting on the diaphragm in said recess, a second annular diaphragm resting on said spacer rings to provide a chamber between said diaphragms, an inherently resilient valve cover fixedly holding the outer edges of said chamber assembly against the casing, a thrust ring surrounding the stem and resting on the second diaphragm, a gland for adjusting the pressure of said thrust ring against the assembly, and means for introducing lubricant under pressure to said chamber to deflect the cover and resiliently urge the plug into its seat.

12. In a plug valve, a casing having a passageway therethrough for flow of fluid and a bore formed transversely of the passageway, a rotatable plug located in said bore, one end of said plug having a substantially flat portion, a cover for said bore means abutting the flat portion of said plug and, providing an expansible chamber with said cover capable of expansion under internal pressure, and means of lesser area than the area of contact between said first means and the flat portion of the plug for compressing fluid under pressure in said chamber to urge the plug into its seat.

SVEN J. NORDSTROM.